UNITED STATES PATENT OFFICE.

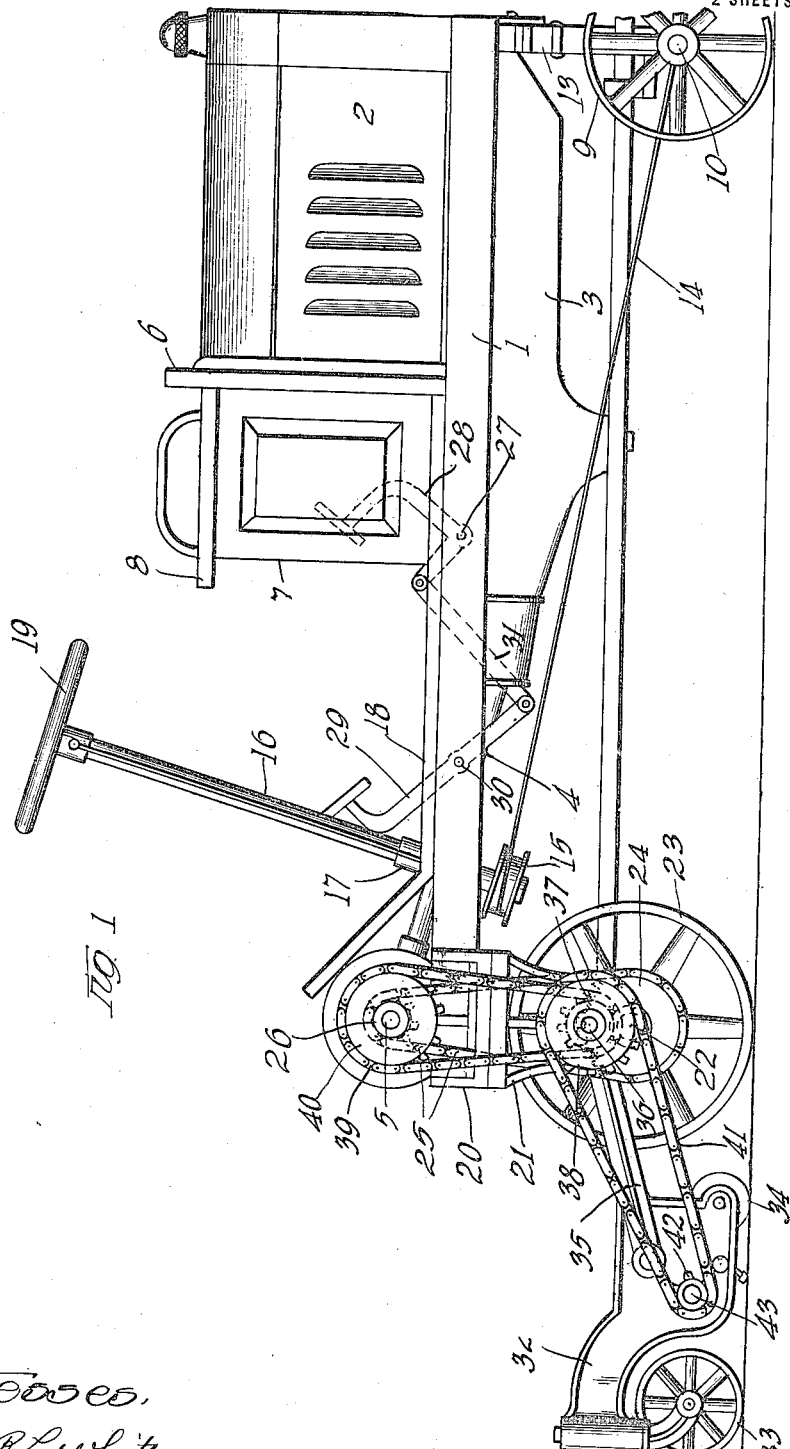

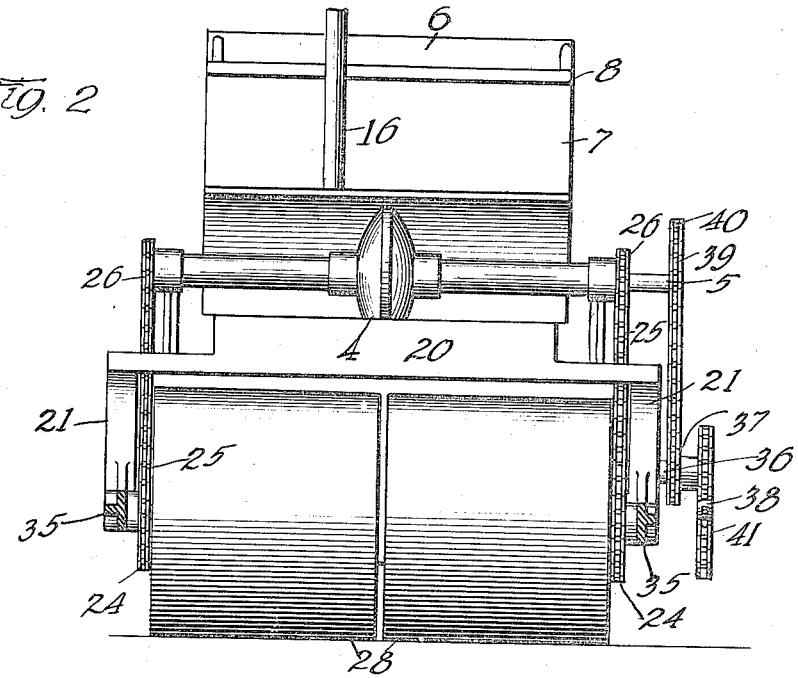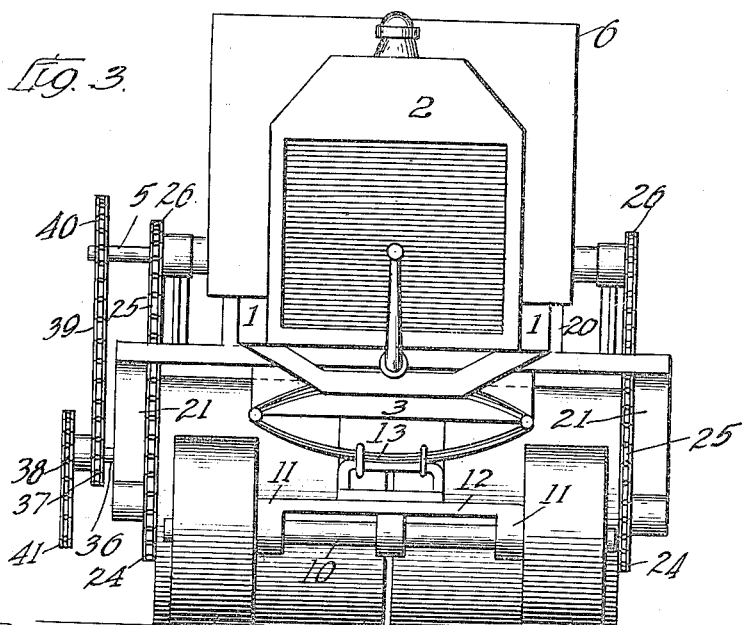

HARRY T. COLDWELL, OF CHICAGO, ILLINOIS.

MOTOR-PROPELLED TRACTOR.

1,283,083.	Specification of Letters Patent.	Patented Oct. 29, 1918.

Application filed August 4, 1917. Serial No. 184,425.

*To all whom it may concern:*

Be it known that I, HARRY T. COLDWELL, citizen of the United States, residing at Chicago, in the county of Cook, and State of Illinois, have invented certain new and useful Improvements in Motor-Propelled Tractors; and I do hereby declare the following to be a full, clear, and exact description of the invention, such as will enable others skilled in the art to which it appertains to make and use the same.

This invention relates to improvements in motor-propelled tractors, and more particularly to improvements in motor-propelled tractor lawn-mowers, and has for its particular object to provide a simple, efficient and comparatively light device of this character converted from a conventional motor vehicle, such for example, as a Ford automobile, in the manner and by the means hereinafter particularly described and claimed.

The invention consists more particularly in the employment of the chassis, motor and drive gear of a conventional automobile and reversing the position of the same so that the motor is carried upon the rear of the frame and the reversing gear employed for normally propelling the vehicle, when converted into a lawn mower tractor, to drive the vehicle forward.

A further object of the invention is to employ the motive power for propelling the vehicle for also propelling the cutting blades of a lawn mower coupled to the forward end of the tractor.

In the accompanying drawings illustrating a tractor embodying my invention:

Figure —1— is a view in side elevation of a lawn mower tractor constructed in accordance with the invention.

Fig. —2— is a front elevation of the same, the lawn mower being removed.

Fig. —3— is a rear elevation of the same.

In the drawings, 1 indicates the side rails of the chassis of a conventional automobile which carries the hood 2 housing the motor carried by said chassis, the crank case, and the drip pan 3 from which the jack shaft 4 projects, the latter being geared in the usual manner to the main drive shaft 5, generally mounted upon the rear end of the frame or chassis. The dash-board 6 usually disposed at the rear end of the hood 2 constitutes a partition wall between the hood and the seat box 7 upon which the seat 8 for the operator is mounted. The usual body and seat of the conventional automobile are removed, as is also the steering gear thereof, but the usual clutch and gear control levers for driving the vehicle at various speeds and in opposite directions are retained. The front wheels of the conventional vehicle are removed, and in lieu thereof tractor wheels 9 having broad tread faces are substituted therefor; the same being carried by a shaft or axle 10 journaled in the bearings 11 of a yoke 12 secured to the spring 13 carrying the motor end of the frame or chassis. The yoke 12 is connected by means of suitable means 14 with a sheave or similar device 15 at the lower end of the steering post 16 suitably mounted in a bearing 17 carried in the floor plate 18, and which may be otherwise suitably rigidly secured to the chassis 1. The said steering post 16 carries the steering wheel 19 which may be supplied with the usual hand levers for controlling the carbureter and other parts of the power plant. It will be understood that the parts not illustrated are identical with those supplied with the conventional automobile, and are operated and suitably connected with the parts controlled thereby to adapt them to my purposes without in any way varying their function or mode of operation. The rear wheels and axle and the springs for supporting the chassis thereof are removed from the conventional automobile, and a suitable yoke or yokes 20 are secured to the rear end of the chassis and are provided with downwardly extending projections or arms 21 containing the bearings for the shaft 22 with which the rollers 23 are rigid. The said shaft 22 carries a relatively large sprocket wheel 24 geared by means of a sprocket chain 25 to a sprocket pinion 26 on the drive-shaft 5 so that the vehicle when propelled at the usual speed of the reversing gear, will move even more slowly than normally; it being obvious that in employing the vehicle for tractor or lawn-mowing purposes, low speed and great power are the desirable factors.

The clutch control shaft 27 provided in the conventional vehicle carries the operating foot-lever 28 which normally is held by means of a spring to maintain the clutch engaged, and is normally pressed forward by the foot in the direction of the hood 2 to disengage said clutch. A foot lever 29 mounted between its ends on a shaft 30 is provided, and the lower end of said foot-lever is connected by means of a link 31 with the foot lever 28 so that as said foot-lever 29 is forced away from the seat box 7 the foot-lever 28 will be forced in the opposite direction for disengaging the clutch; it being obvious that the vehicle will be propelled in either direction according to the position of the lever controlling the reversing gear, which lever is not herein illustrated.

The vehicle thus reconstructed or converted may obviously be employed for all purposes for which tractors are adapted. My particular object, however, is to provide a suitable tractor for pushing a lawn mower for use particularly on very large lawns, such as golf courses, parks and the like, and for actuating the mower blades simultaneously with the propulsion of the vehicle, and preferably at a very high speed. Accordingly, I provide a lawn mower comprising the frame 32 in which caster wheels 33 and an idle roll 34 are suitably mounted. The said frame 32 is connected by means of the bars 35 pivotally secured thereto, and also pivotally secured to the projecting portions 21 of the yokes 20, with the vehicle, the pivotal connections being preferably such as will permit of a swing of the frame 32 about a horizontal axis extending longitudinally of the vehicle so as to accommodate itself readily to various slopes of ground over which it passes. The pivotal connection of the bars 35 with the said projections 21 is preferably effected by means of stub shafts 36 each carrying a small sprocket 37 rigid with a larger sprocket 38, both revoluble on said stub shaft 36. The smaller sprocket 37 is geared by means of sprocket chain 39 with a relatively large sprocket 40 on the shaft 5, and the sprocket 38 is geared by means of a sprocket chain 41 with the sprocket pinion 42 on the shaft 43 carrying the rotatable mower blades of the ordinary type.

It will be obvious from the foregoing that the vehicle is steered by means of the yoke underneath the motor end of the chassis which, because of the number of ground-engaging wheels at the forward end of the vehicle, will render steering of the latter far easier than if such steering were done by swinging the front wheels on a vertical axis or axes.

The lawn-mower may be uncoupled in the event that it is desired to use the vehicle as a tractor for drawing other vehicles or for a lawn or pavement roller.

While I have shown the preferred embodiment of the invention in the accompanying drawings, it will be obvious, of course, that the specific details of construction shown and described may be changed as mechanical skill may dictate without departing from the invention as defined in the appended claims.

In the drawings I have shown the invention as carried out for converting a Ford automobile. The invention may also be embodied with other designs of automobiles, and in each instance some changes in details of construction will obviously be required to adapt the invention to the particular type of chassis, etc., contained in the conventional pleasure vehicle.

I claim as my invention:

1. The combination of a conventional motor vehicle having the customary forwardly located engine, and steering mechanism, and having the customary body portion removed to constitute the forward portion of a tractor, suitable traction wheels, a seat facing away from the normal front of the vehicle and a steering device before said seat coupled to said first-mentioned steering mechanism to enable steering the tractor at its rear portion.

2. The combination of a conventional motor vehicle having the customary forwardly located engine and steering mechanism, and having a customary body portion removed to constitute the front end of a tractor, a seat facing away from the normal front of the vehicle, a steering control device adjacent to said seat, and a clutch control located before said seat and coupled to the normal clutch control connections of the vehicle, whereby the normal front steering mechanism will be converted into a rear steering mechanism for the tractor, and suitable traction wheels.

3. The combination with a conventional motor vehicle having the customary forwardly located engine and front steering mechanism, and having the customary body portion removed to constitute a forward portion of a tractor, drive and steering control means facing toward the normal forward end of the machine and converting the normal forward steering mechanism into the tractor rear steering mechanism to enable the machine to be controlled and operated with the operator facing the normal rear of the vehicle, and suitable traction wheels.

4. The combination of a conventional motor vehicle having the customary forwardly located engine and front steering mechanism, and having its customary body removed to constitute a relatively low down front end of a tractor, a support for the operator facing rearwardly of the normal front of the vehicle, steering and drive control mechanisms accessible to said operator from his said support, said steering control being coupled to the normal front steering mechanism to constitute a rear steering mechanism for the tractor, and suitable traction wheels.

5. The combination of a conventional motor vehicle having the customary forwardly located engine and front steering wheels, and having the customary body portion removed to constitute a relatively low-down front end of a tractor, a seat for the operator arranged in rear of the engine and facing away therefrom in position to enable a view of the operator of the ground immediately in front of the tractor, a drive control and a steering control accessible to the operator, the steering control being coupled to the normal front steering mechanism of the vehicle to constitute a rear steering mechanism for the tractor and suitable traction wheels.

6. The combination of a conventional motor vehicle having the customary forwardly located engine and front steering mechanism, and having the customary body removed to constitute the forward end of a tractor, a support for the operator adjacent to said forward end of the tractor, driving and steering devices adjacent thereto, the steering device being coupled to the normal front steering mechanism of the vehicle to constitute a rear steering mechanism for the tractor and suitable wheels for the tractor.

HARRY T. COLDWELL.

Copies of this patent may be obtained for five cents each, by addressing the "Commissioner of Patents, Washington, D. C."